(12) United States Patent
Yang et al.

(10) Patent No.: US 11,277,745 B2
(45) Date of Patent: Mar. 15, 2022

(54) INTEGRITY PROTECTION CONTROL METHOD, NETWORK DEVICE AND COMPUTER STORAGE MEDIUM

(71) Applicant: GUANGDONG OPPO MOBILE TELECOMMUNICATIONS CORP., LTD., Guangdong (CN)

(72) Inventors: Ning Yang, Guangdong (CN); Jari Jaakko Isokangas, Tampere (FI)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/760,690

(22) PCT Filed: Nov. 8, 2017

(86) PCT No.: PCT/CN2017/109940
§ 371 (c)(1),
(2) Date: Apr. 30, 2020

(87) PCT Pub. No.: WO2019/090515
PCT Pub. Date: May 16, 2019

(65) Prior Publication Data
US 2020/0336912 A1    Oct. 22, 2020

(51) Int. Cl.
*H04W 12/10*    (2021.01)
*H04L 29/08*    (2006.01)
(Continued)

(52) U.S. Cl.
CPC .......... *H04W 12/10* (2013.01); *H04L 63/123* (2013.01); *H04L 69/327* (2013.01); *H04W 12/02* (2013.01); *H04W 24/02* (2013.01); *H04W 76/10* (2018.02)

(58) Field of Classification Search
CPC ..... H04W 60/00; H04W 76/12; H04W 76/10; H04W 12/08; H04W 24/02; H04W 76/15;
(Continued)

(56) References Cited

U.S. PATENT DOCUMENTS 9,055,442 B2    6/2015    Deng
2012/0315878 A1    12/2012    Deng
(Continued)

FOREIGN PATENT DOCUMENTS

CN    101115280 A    1/2008
CN    102158901 A    8/2011
(Continued)

OTHER PUBLICATIONS

3GPP TS 23.501 V1.4.0, p. 14,85-86, dated Sep. 2017 (Year: 2017).*
(Continued)

*Primary Examiner* — Daniel Lai
(74) *Attorney, Agent, or Firm* — Perkins Coie LLP

(57) ABSTRACT

Disclosed in the present invention are an integrity protection control method, a network device and computer storage medium, the method comprising: acquiring parameter configuration information, wherein the parameter configuration information is parameter configuration information saved by a network device or parameter configuration information acquired from a core network side; and on the basis of the parameter configuration information, determining whether it is necessary to start integrity protection for a quality of service (QoS) data flow.

15 Claims, 2 Drawing Sheets

(51) Int. Cl.
| | |
|---|---|
| *H04W 76/10* | (2018.01) |
| *H04L 29/06* | (2006.01) |
| *H04L 69/327* | (2022.01) |
| *H04W 12/02* | (2009.01) |
| *H04W 24/02* | (2009.01) |

(58) Field of Classification Search
CPC ... H04W 76/18; H04W 12/033; H04W 76/19; H04W 80/02; H04W 76/25; H04W 12/02; H04W 12/106; H04W 76/22; H04W 12/037; H04W 12/40; H04W 12/00; H04W 12/009; H04W 12/03; H04W 12/041; H04W 12/06; H04W 12/10; H04W 12/61; H04W 12/72; H04W 76/20; H04W 12/04; H04W 12/0431; H04W 12/0433; H04W 12/48; H04W 24/04; H04W 76/00; H04W 28/0268; H04L 65/1073; H04L 47/2483; H04L 63/123; H04L 69/327; H04M 15/8228
See application file for complete search history.

(56) References Cited

U.S. PATENT DOCUMENTS

| | | | |
|---|---|---|---|
| 2014/0269613 A1 | 9/2014 | Tiwari et al. | |
| 2015/0143463 A1* | 5/2015 | Baghel | H04L 63/20 726/3 |
| 2017/0303259 A1 | 10/2017 | Lee et al. | |
| 2019/0082325 A1* | 3/2019 | Muhanna | H04L 63/08 |
| 2019/0246282 A1* | 8/2019 | Li | H04W 12/10 |
| 2019/0372995 A1* | 12/2019 | Lou | H04L 63/123 |
| 2020/0100101 A1* | 3/2020 | Torvinen | H04W 12/106 |
| 2020/0228975 A1* | 7/2020 | Li | H04W 12/033 |

FOREIGN PATENT DOCUMENTS

| | | |
|---|---|---|
| CN | 102378393 A | 3/2012 |
| CN | 102487507 A | 6/2012 |
| CN | 106162626 A | 11/2016 |
| EP | 2528369 A1 | 11/2012 |
| JP | 2010533415 A | 10/2010 |
| JP | 2020519190 A | 6/2020 |
| KR | 20170038096 A | 4/2017 |
| WO | 2017011114 A1 | 1/2017 |
| WO | 2017074247 A1 | 5/2017 |
| WO | 2018201630 A1 | 11/2018 |

OTHER PUBLICATIONS

S3-160588 "Security for RRC Connection Suspend and Resume" by Ericsson, dated May 9, 2016 (Year: 2016).*
"3rd Generation Partnership Project; Technical Specification Group Services and System Aspects; 3GPP System Architecture Evolution (SAE); Security architecture (Release 15)" 3GPP TS 33.401 V15.4.0 (Jun. 2018) http://www.3gpp.org.
English translation of the Written Opinion of the International Search Authority in the international application No. PCT/CN2017/109940, dated Dec. 29, 2017.
Huawei et A L: "Interim agreement on UP integrity protection negotiation", 3GPP Draft; S3-171211—Interim Agreement for Up Integrity, 3RD Generation Partnership Project (3GPP), Mobile Competence Centre; 650, Route Des Lucioles; F-06921 Sophia-Antipolis Cedex; France, vol. SA WG3, No. Ljubljana, Slovenia; May 15, 2017-May 19, 2017, May 14, 2017 (May 14, 2017), XP051282709, Retrieved from the Internet :URL:http :// www .3gpp .org/ftp/Meetings 3GPP SYNC/ SA3/Docs/* the whole document *.
Ericsson ;"Clause 8 (user plane security-integrity protection)", 3GPP Draft; S3-172339_8_As_Security Userplane_Integrity_Protection, 3RD Generation Partnership Project (3GPP), Mobile Competence Centre; 650, Route Des Lucioles; F-06921 Sophi A-Antipolis Cedex; FRA, vol. SA WG3, No. Singapore; Oct. 9, 2017-Oct. 13, 2017, Oct. 6, 2017(Oct. 6, 2017), XP051348212, Retrieved from the Internet :URL http :// www .3gpp .org/ftp/Meetings 3GPP SYNC/ SA3/Docs/[ retrieved on Oct. 6, 2017]* the whole document *.
Nokia:"UP integrity protection solution for negotiation per bearer", 3GPP Draft; S3-170659 Up Integrity Security So Lution Per Bearer, 3RD Generation Partnership Project (3GPP), Mobile Competence Centre; 650, Route Des Lucioles; F-06921 Sophia-Antipo Lis Cedex; France, vol. SA WG3 , No. Busan; Mar. 27, 2017-Mar. 31, 2017, Mar. 27, 2017 (Mar. 27, 2017), XP051248413, Retrieved from the Internet URL:http:// www.3gpp.org/ftp/Meetings 3GPP SYNC/ SA3iooc s/[retrieved on Mar. 27, 2017 ]* the whole document *.
Supplementary European Search Report in the European application No. 17931465.3, dated Sep. 22, 2020.
International Search Report in the international application No. PCT/CN2017/109940, dated Dec. 29, 2017.
First Office Action of the Canadian application No. 3081114, dated Jun. 3, 2021. 5 pages.
First Office Action of the Chinese application No. 202010378856.8, dated Jun. 16, 2021. 14 pages with English translation.
Zte Corporation: "Consideration on UP integrity configuration", 3GPP Draft; R2-1710314; vol. RAN WG2, No. Prague, Czech Republic; Oct. 9, 2017-Oct. 13, 2017 Oct. 8, 2017 (Oct. 8, 2017), XP051342362. 3 pages.
Huawei et al.: "AS Security Negotiation and Activation", 3GPP Draft; S3-172277 PCR-TO-TS33501; vol. SA WG3, No. Singapore; Oct. 9, 2017-Oct. 13, 2017 Oct. 6, 2017 (Oct. 6, 2017), XP051348151. 6 pages.
Nokia et al.: "Text Proposal for POU Session Resource Setup messages", 3GPP Draft; R3-173326 TPSESSIONSETUP38413, vol. RAN WG3, No. Berlin, Germany; Aug. 21, 2017-Aug. 25, 2017 Aug. 25, 2017 (Aug. 25, 2017), XP051330637. 7 pages.
First Office Action of the European application No. 17931465.3, dated Jun. 18, 2021. 7 pages.
Office Action of the Indian application No. 202027023137, dated Jun. 22, 2021. 5 pages.
First Office Action of the Korean application No. 10-2020-7013805, dated Jun. 29, 2021. 6 pages.
Second Office Action of the Chinese application No. 202010378856.8, dated Sep. 6, 2021. 11 pages with English translation.
Huawei, Hisilicon, "A solution for UP security negotiation", 3GPP TSG SA WG3 (Security) Meeting #87 S3-171606, May 15-19, 2017, Ljubljana, Slovenia. 3 pages.
Huawei, HiSilicon, "OI#2 TS 23.501: Updates Network Slicing and NSSF description", SA WG2 Meeting #123 S2-178134, Oct. 23-27, 2017, Ljubljana, Slovenia. 7 pages.
Ericsson, "Solution fora PDU session-specific security negotiation (KI #1.16)", 3GPP TSG SA WG3 (Security) Meeting 487 S3-171593, May 15-19, 2017, Ljubljana, Slovenia. 3 pages.
First Office Action of the Japanese application No. 2020-524531, dated Oct. 8, 2021 20 pages with English translation.
Second Office Action of the European application No. 17931465.3, dated Dec. 10, 2021. 4 pages.
Notice of Allowance of the Korean application No. 10-2020-7013805, dated Nov. 25, 2021. 3 pages with English translation.
First Office Action of the Taiwanese application No. 107139363, dated Nov. 30, 2021. 12 pages with English translation.

* cited by examiner

ID CONTROL METHOD, NETWORK DEVICE AND COMPUTER STORAGE MEDIUM

INTEGRITY PROTECTION CONTROL METHOD, NETWORK DEVICE AND COMPUTER STORAGE MEDIUM

CROSS-REFERENCE TO RELATED APPLICATIONS

The present application is a U.S. National Phase Entry of International PCT Application No. PCT/CN2017/109940 filed on Nov. 8, 2017, and entitled "INTEGRITY PROTECTION CONTROL METHOD, NETWORK DEVICE AND COMPUTER STORAGE MEDIUM", the content of which is hereby incorporated by reference in its entirety.

TECHNICAL FIELD

The disclosure relates to the field of communication processing technology, and particularly to a controlling method for Integrity Protection (IP), a network device and a computer storage medium.

BACKGROUND

In a Long Term Evolution (LTE) system, IP is used only in Signaling Radio Bearer (SRB), and almost never used in Data Radio Bearer (DRB). In a New Radio (NR) system, whether each DRB enables the IP may be controlled by a Radio Access Network (RAN) through Radio Resource Control (RRC) signaling. However, a problem with this is how can the RAN determine whether the IP for the DRB requires to be enabled.

SUMMARY

For solving the technical problem, embodiments of the disclosure provide a controlling method for IP, a network device and a computer storage medium.

The embodiments of the disclosure provide a controlling method for IP, which is applied to a network device and may include the following operations.

Parameter configuration information is acquired, and the parameter configuration information is stored in the network device or acquired from a Core Network (CN) side.

Whether it is required to enable the IP for a Quality of Service (QoS) data flow is determined based on the parameter configuration information.

The embodiments of the disclosure provide a network device, which may include a communication unit and a processing unit.

The communication unit is configured to acquire parameter configuration information, and the parameter configuration information is stored in the network device or acquired from a CN side.

The processing unit is configured to determine, based on the parameter configuration information, whether it is required to enable the IP for a QoS data flow.

The embodiments of the disclosure provide a network device, which may include: a processor and a memory configured to store a computer program capable of running in the processor.

The processor is configured to run the computer program to execute steps of the abovementioned method.

The embodiments of the disclosure also provide a computer storage medium having stored a computer-executable instructions that, when being executed, implement the steps of the abovementioned method.

The technical solutions of the embodiments of the disclosure can determine, based on the acquired parameter configuration information, whether to enable the IP for the QoS data flow. In such matter, it is ensured that a network side device can perform a judgment for the IP by itself, thereby ensuring timeliness and effectiveness of enabling the IP for the data flow.

DETAILED DESCRIPTION

In order to understand characteristics and technical contents of the embodiments of the present disclosure in more detail, the implementation of the embodiments of the disclosure is elaborated in combination with the accompanying drawings. The accompanying drawings are only used for reference, but not intended to limit the embodiments of the disclosure.

Embodiment 1

Figure 1:
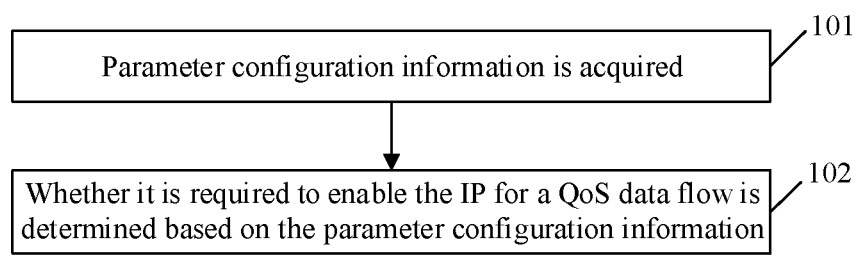
FIG. 1 is a flowchart of a controlling method for IP according to an embodiment of the disclosure.

An embodiment of the disclosure provides a controlling method for IP, which is applied to a network device and as shown in FIG. 1, may include the following steps.

At S101, parameter configuration information is acquired, and the parameter configuration information is stored in the network device or acquired from a CN side.

At S102, whether it is required to enable the IP for a QoS data flow is determined based on the parameter configuration information.

Here, the network device may be a radio access network device, for example, a device of a RAN.

The parameter configuration information may be configuration information capable of representing IP related information or configuration information capable of determining the IP related information.

For S101, how to acquire the parameter configuration information is described below according to many cases.

The first case may be that: the parameter configuration information is acquired from network slice selection assistance information in a Protocol Data Unit (PDU) session, for example, the parameter configuration information is acquired from S-NSSAI included in the PDU session. That is, a CN may add related information capable of indicating the IP in the S-NSSAI of the PDU session, and add the IP related information in the parameter configuration information of the S-NSSAI. And then, the RAN can acquire the parameter configuration information from the S-NSSAI included in the PDU session, and acquire the related information of IP from the parameter configuration information; and whether to enable the IP for the QoS data flow and the PDU session is determined based on the related information of IP.

The second case may be that: the parameter configuration information is acquired from a 5G QoS Indicator (5QI). In this case, the IP related information may be determined based on the parameter configuration information. That is, before all operations are performed, the RAN may complete parameter configuration with the CN; for example, the RAN may acquire the 5QI through a control plane, and then, when it is required to judge whether to enable the IP for some or a certain of QoS data flows, acquire the parameter configuration information from the 5QI to extract the IP related information from the parameter configuration information.

The third case may be that: the IP related information corresponding to the QoS data flow is acquired from the network side.

Specifically, the IP related information at least includes: indication information of the IP, for indicating whether it is required to enable the IP for the QoS data flow. The indication information may include an ID of the QoS data flow to be indicated, that is, when the indication information of the IP includes the ID of the QoS data flow, it is determined that the network side indicates enabling the IP for the data flow.

The IP related information further includes: attribute information of the IP, and an effective duration.

The attribute information of the IP is used to represent description information of a data packet requiring the IP in the QoS data flow, and the effective duration is used to represent a use duration of the indication information of the IP and the attribute information of the IP.

The description information includes at least one of an internet protocol address, a Uniform Resource Locator (URL) or URP. That is, the location of the IP related information may be described through the attribute information.

In addition, the use duration of the indication information of the IP and the attribute information of the IP corresponding to a certain or some of the QoS data flows or all the QoS data flows can be indicated via the effective duration. Correspondingly, the starting time of the effective duration may be calculated from the time when the IP related information is sent, or may be timed from when it is determined to enable the IP for a certain or all of the QoS data flows until the effective duration is reached.

It may be understood that after the effective duration is reached, it is possible to continue to wait for new IP related information, which is sent from the CN.

Furthermore, the operation that the IP related information corresponding to the QoS data flow is acquired from the CN side includes one of multiple ways as follows.

The first way is that: corresponding IP related information is acquired from a QFI of the QoS data flow which is sent from the CN side. The QFI is QoS Flow Identity.

The second way is that: corresponding IP related information is acquired from a packet header of the QoS data flow which is sent from the CN side.

The third way is that: corresponding IP related information is acquired from parameters of the QoS data flow (QoS Parameters) which are sent from the CN side.

The fourth way is that corresponding IP related information is acquired from a profile of the QoS data flow (QoS Profile) which is sent from the CN side.

It is to be further noted that when the abovementioned information is received from the network side, the information may be acquired through control plane data or user plane data. When the information is acquired through the control plane data, the abovementioned information may be transmitted during a path establishment. When the information is acquired through the user plane data, the abovementioned information may be acquired from the packet header of transmission data during a transmission of the user plane data.

Furthermore, in S102, how to determine, based on the configuration parameter information, whether to enable the IP for a target QoS data flow may include multiple processing ways as follows.

The first processing way is that: whether to enable the IP for the target QoS data flow is determined based on the IP related information.

That is, if the indication information of the IP related information includes Identification (ID) information for the QoS data flow, it is determined to enable the IP for the target QoS data flow; or else, the IP is disenabled.

The second processing way is that: a radio bearer for at least one QoS data flow requiring to enable IP which is indicated by the CN side is generated based on the IP related information, the radio bearer is used to control enabling of the IP for the at least one QoS data flow.

The at least one QoS data flow requiring to enable the IP may include all the QoS data flows which are indicated by the network side. The operation that the radio bearer is generated for the at least one QoS data flow may include that the ID information of all the QoS data flows requiring to enable the IP is sent to a receiving end through the radio bearer.

The third processing way is that: when the indication information of the IP related information indicates that the IP for the target QoS data flow is enabled, and volume of the target QoS data flow exceeds a preset threshold, the IP for the target QoS data flow is disenabled.

The operation of judging whether the target QoS data flow exceeds the preset threshold may be that the volume of the target QoS data flow exceeds the preset threshold, or that the load included in its corresponding bearer exceeds the preset threshold. So, it can be ensured that a signaling load will not be increased.

It can be seen that by using the abovementioned technical solutions, whether to enable the IP for the QoS data flow can be determined based on the acquired parameter configuration information. In such a manner, it is ensured that a network side device can perform a judgment for the IP by itself, thereby ensuring timeliness and effectiveness of enabling the IP for the data flow.

Embodiment 2

Figure 2:
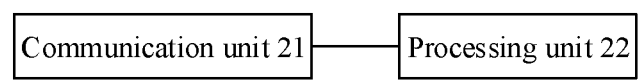
FIG. 2 is a structure diagram of a network device according to an embodiment of the disclosure.

An embodiment of the disclosure provides a network device which is provided as shown in FIG. 2 and may include a communication unit 21 and a processing unit 22.

The communication unit 21 is configured to acquire the parameter configuration information, the parameter configuration information is stored in the network device or acquired from the CN side.

The processing unit 22 is configured to determine, based on the parameter configuration information, whether it is required to enable the IP for the QoS data flow.

Here, the network device may be the radio access network device, for example, the device of the RAN.

The parameter configuration information may be the configuration information capable of representing the IP related information or the configuration information capable of determining the IP related information.

How to acquire the parameter configuration information is described below according to many cases.

The first case may be that: the communication unit 21 acquires the parameter configuration information from the network slice selection assistance information in the PDU session, for example, acquires the parameter configuration information from the S-NSSAI included in the PDU session.

That is, the CN may add the related information capable of indicating the IP in the S-NSSAI of the PDU session, and add the IP related information in the parameter configuration information of the S-NSSAI. And then, the RAN can acquire the parameter configuration information from the S-NSSAI included in the PDU session, and acquire the IP related information from the parameter configuration information; and whether to enable the IP for the QoS data flow and the PDU session is determined based on the IP related information.

The second case may be that the communication unit 21 acquires the parameter configuration information from the 5QI. In this case, the IP related information may be determined based on the parameter configuration information. That is, before all operations are performed, the RAN may complete parameter configuration with the CN; for example, the RAN may acquire the 5QI through the control plane, and then, when it is required to judge whether to enable the IP for some or a certain of QoS data flows, acquire the parameter configuration information from the 5QI to extract the IP related information from the parameter configuration information.

The third case may be that the communication unit 21 acquires the IP related information corresponding to the QoS data flow from the network side.

Specifically, the IP related information at least includes: the indication information of the IP, for indicating whether it is required to enable the IP for the QoS data flow. The indication information may include the ID of the QoS data flow to be indicated, that is, when the indication information of the IP includes the ID of the QoS data flow, it is determined that the network side indicates enabling the IP for the data flow.

The IP related information further includes: the attribute information of the IP, and the effective duration.

The attribute information of the IP is used to represent description information of the data packet requiring the IP in the QoS data flow, and the effective duration is used to represent a use duration of the indication information of the IP and the attribute information of the IP.

The description information includes at least one of the internet protocol address, a URL or the URP. That is, the location of the IP related information may be described through the attribute information.

In addition, the use duration of the indication information of the IP and the attribute information of the IP corresponding to a certain or some of the QoS data flows or all the QoS data flows can be indicated via the effective duration. Correspondingly, the starting time of the effective duration may be calculated from the time when the IP related information is sent, or may be timed from when it is determined to enable the IP for a certain or all of the QoS data flows until the effective duration is reached.

It may be understood that after the effective duration is reached, it is possible to continue to wait for new IP related information, which is sent from the CN.

Furthermore, the operation that the IP related information corresponding to the QoS data flow is acquired from the CN side includes one of multiple ways as follows.

The first way is that: the communication unit 21 acquires corresponding IP related information from the QFI of the QoS data flow which is sent from the CN side. The QFI is QoS Flow Identity.

The second way is that the communication unit 21 acquires corresponding IP related information from the packet header of the QoS data flow which is sent from the CN side.

The third way is that the communication unit 21 acquires corresponding IP related information from the parameters of the QoS data flow (QoS Parameters) which are sent from the CN side.

The fourth way is that: the communication unit 21 acquires corresponding IP related information from the profile of the QoS data flow (QoS Profile) which is sent from the CN side.

It is to be further noted that when the abovementioned information is received from the network side, the information may be acquired through control plane data or user plane data. When the information is acquired through the control plane data, the abovementioned information may be transmitted during a path establishment. When the information is acquired through the user plane data, the abovementioned information may be acquired from the packet header of transmission data during a transmission of the user plane data.

Furthermore, how to determine, based on the configuration parameter information, whether to enable the IP for a target QoS data flow may include multiple processing ways as follows.

The first processing way is that: the processing unit 22 determines, based on the IP related information, whether to enable the IP for the target QoS data flow.

That is, if the indication information of the IP related information includes the ID information for the QoS data flow, it is determined to enable the IP for the target QoS data flow; or else, the IP is disenabled.

The second processing way is that: the processing unit 22 generates, based on the IP related information, a radio bearer for at least one QoS data flow requiring to enable IP which is indicated by the CN side, the radio bearer is used to control enabling of the IP of at least one QoS data flow.

The at least one QoS data flow requiring to enable the IP may include all the QoS data flows which are indicated by the network side. The operation that the radio bearer is generated for the at least one QoS data flow may include that the ID information of all the QoS data flows requiring to enable the IP is sent to the receiving end through the radio bearer.

The third processing way is that when the indication information of the IP related information indicates that the IP is enabled for the target QoS data flow, and the volume of the target QoS data flow exceeds a preset threshold, the processing unit 22 does not enable the IP for the target QoS data flow.

The operation of judging whether the target QoS data flow exceeds the preset threshold may be that the volume of the target QoS data flow exceeds the preset threshold, or that the load included in its corresponding bearer exceeds the preset threshold. So, it can be ensured that a signaling load will not be increased.

It can be seen that by using the abovementioned technical solutions, whether to enable the IP for the QoS data flow can be determined based on the acquired parameter configuration information. In such a manner, it is ensured that the network side device can perform a judgment for the IP by itself, thereby ensuring timeliness and effectiveness of enabling the IP for the data flow.

Figure 3:
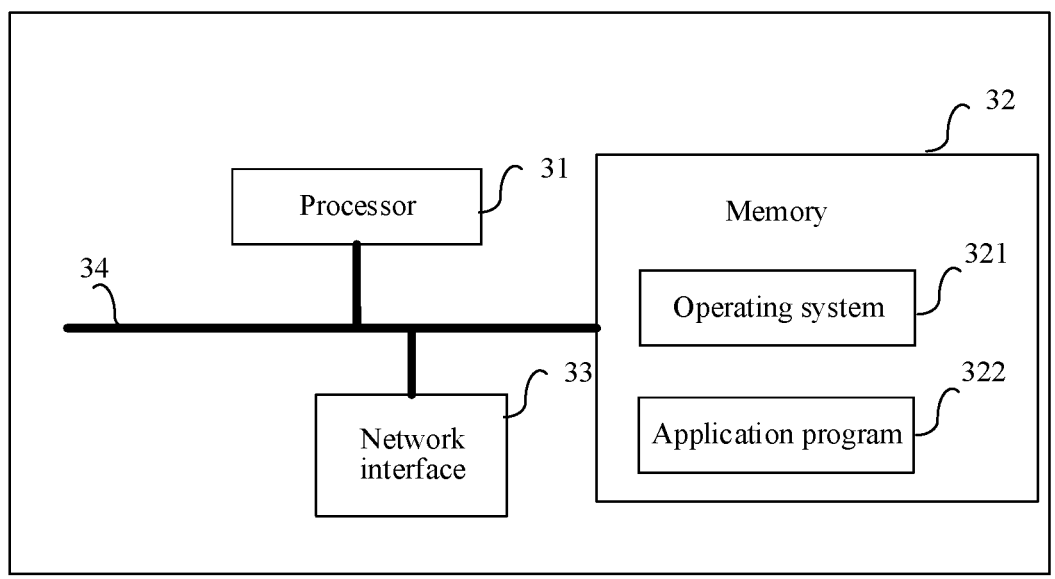
FIG. 3 is a schematic diagram of a hardware architecture according to an embodiment of the disclosure.

The embodiments of the disclosure also provide a hardware composition architecture of user equipment or receiver equipment, which, as shown in FIG. 3, includes at least one processor 31, a memory 32 and at least one network interface 33. Each component is coupled together through a bus system 34. It may be understood that the bus system 34 is configured to implement connection communication between these components. The bus system 34 includes a data bus and further includes a power bus, a control bus and a state signal bus. However, for clear description, various buses in FIG. 3 are marked as the bus system 34.

It may be understood that the memory 32 in the embodiment of the disclosure may be a volatile memory or a nonvolatile memory, or may include both the volatile and nonvolatile memories.

In some implementation modes, the memory 32 stores the following elements, executable modules or data structures, or a subset thereof or an extended set thereof:

an operating system 321 and an application program 322.

The processor 31 is configured to be capable of processing the steps of the method in embodiment 1, and elaborations are omitted herein.

An embodiment of the disclosure provides a computer storage medium having stored a computer-executable instructions that, when being executed, implement the steps of the method of embodiment 1.

When being implemented in form of software functional module and sold or used as an independent product, the device of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, an embodiment of the disclosure also provides a computer storage medium, in which a computer program is stored. The computer program is configured to execute the data scheduling method of the embodiments of the disclosure.

Although the preferred embodiments of the disclosure have been disclosed for the exemplary purposes, those skilled in the art may realize that it is also possible to make various improvements, additions and replacements. Therefore, the scope of the disclosure should not be limited to the abovementioned embodiments.

The invention claimed is:

1. A controlling method for Integrity Protection (IP), applied to a network device, comprising:
   acquiring parameter configuration information, wherein the parameter configuration information is stored in the network device or acquired from a Core Network (CN) side; and
   determining, based on the parameter configuration information, whether it is required to enable the IP for a Protocol Data Unit (PDU) session;
   wherein acquiring the parameter configuration information comprises:
   acquiring IP related information for the PDU session from a CN;
   wherein the method further comprises:
   when indication information of the IP related information indicates enabling the IP for a target PDU session, and volume of the target PDU session exceeds a preset threshold, disabling the IP for the target PDU session.

2. The method of claim 1, wherein the method further comprises:
   determination of whether to enable the IP for the PDU session is based on network slice selection assistance information, the network slice selection assistance information being S-NSSAI comprised in the PDU session.

3. The method of claim 1, wherein the IP related information at least comprises: indication information of the IP, for indicating whether it is required to enable the IP for the PDU session.

4. The method of claim 1, wherein acquiring the IP related information for the PDU session from the CN comprises:
   acquiring corresponding IP related information from a profile of the PDU session which is sent from the CN.

5. The method of claim 1, wherein the method further comprises:
   determining, based on the IP related information, whether to enable the IP in a radio bearer for transmitting a target PDU session.

6. The method of claim 1, wherein the method further comprises:
   generating, based on the IP related information, a radio bearer for at least one PDU session requiring to enable the IP which is indicated by the CN side, wherein the radio bearer is used to control enabling of the IP for the at least one PDU session.

7. The method of claim 1, wherein the method further comprises:
   determining, based on the parameter configuration information, IP related information.

8. A network device, comprising:
   at least one network interface configured to acquire parameter configuration information, wherein the parameter configuration information is stored in the network device or acquired from a Core Network (CN) side; and
   a processor configured to determine, based on the parameter configuration information, whether it is required to enable an Integrity Protection (IP) for a Protocol Data Unit (PDU) session;
   wherein the at least one network interface is configured to:
   acquire IP related information for the PDU session from a CN;
   wherein the processor is further configured to disable the IP for a target PDU session when the indication information of the IP related information indicates enabling the IP for the target PDU session, and volume of the target PDU session exceeds a preset threshold.

9. The network device of claim 8, wherein,
   determination of whether to enable the IP for the PDU session is based on network slice selection assistance information, the network slice selection assistance information being S-NSSAI comprised in the PDU session.

10. The network device of claim 8, wherein the IP related information at least comprises: indication information of the IP, for indicating whether it is required to enable the IP for the PDU session.

11. The network device of claim 8, wherein the at least one network interface is further configured to acquire corresponding IP related information from a profile of the PDU session which is sent from the CN.

12. The network device of claim 8, wherein the processor is further configured to determine, based on the IP related information, whether to enable the IP in a radio bearer for transmitting a target PDU session.

13. The network device of claim 8, wherein the processor is further configured to generate, based on the IP related information, a radio bearer for at least one PDU session requiring to enable the IP which is indicated by the CN side, wherein the radio bearer is used to control enabling of the IP for the at least one PDU session.

14. The network device of claim 8, wherein the processor is further configured to determine, based on the parameter configuration information, IP related information.

15. A non-transitory computer storage medium having stored computer-executable instructions that, when being executed, implement a controlling method for Integrity Protection (IP), the method comprising:
   acquiring parameter configuration information, wherein the parameter configuration information is stored in the network device or acquired from a Core Network (CN) side; and
   determining, based on the parameter configuration information, whether it is required to enable the IP for a Protocol Data Unit (PDU) session;
   wherein acquiring the parameter configuration information comprises:
   acquiring IP related information for the PDU session from a CN;
   wherein the method further comprises:
   when indication information of the IP related information indicates enabling the IP for a target PDU session, and volume of the target PDU session exceeds a preset threshold, disabling the IP for the target PDU session.

* * * * *